Sept. 14, 1937.  W. S. WATSON  2,093,062

PISTON PACKING MEMBER

Filed April 24, 1935

INVENTOR
WILLIAM S. WATSON.
BY
Harness, Dind Patee & Harris.
ATTORNEYS

Patented Sept. 14, 1937

2,093,062

UNITED STATES PATENT OFFICE 2,093,062

PISTON PACKING MEMBER

William Stanley Watson, Winnipeg, Manitoba, Canada, assignor to Chrysler Corporation, Highland Park, Mich., a corporation of Delaware Application April 24, 1935, Serial No. 17,908

2 Claims. (Cl. 309—34)

This invention relates to a piston packing member and is illustrated as embodied in a packing member for use with a piston in a hydraulic brake operating cylinder.

An object of the invention is to provide an expander for a yieldable packing member together with a resilient means which causes the expander to urge the packing member axially and radially into contact with the end of a piston and the inner periphery of the cylinder within which the piston reciprocates.

Another object of the invention is to provide an expander for a yieldable packing member which is positioned radially by its contact with the cylinder wall to obtain a uniform radial pressure on the packing member.

Other objects and advantages of the invention will more fully appear from the following description taken in connection with the accompanying drawing in which:—

Figure 1:
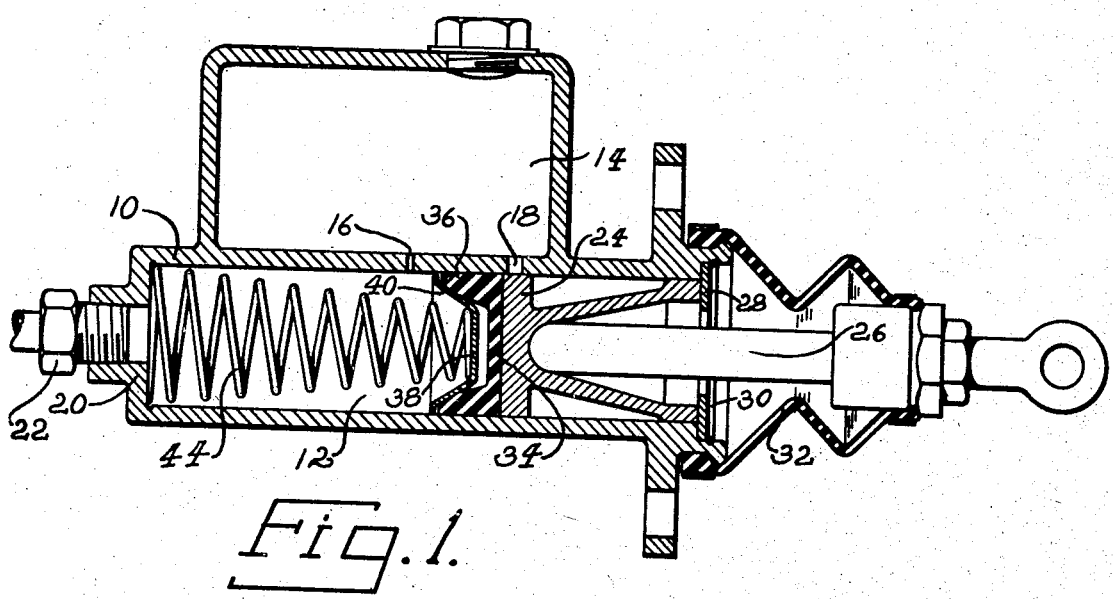
Fig. 1 is a sectional view of a hydraulic brake cylinder showing a preferred form of my invention.
Figure 2:
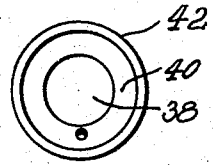
Fig. 2 is an end view showing in elevation the expander.
Figure 3:
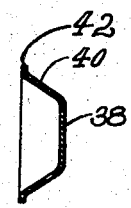
Fig. 3 is a sectional view taken on line 3—3 of Fig. 2.
Figure 4:
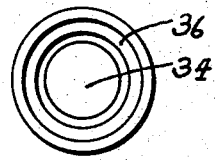
Fig. 4 is an end view showing in elevation the yieldable cup member.
Figure 5:
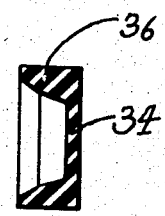
Fig. 5 is a sectional view taken on line 5—5 of Fig. 4.

Referring to the drawing, I have illustrated a hydraulic brake master cylinder housing 10 having a cylinder 12 and a reservoir 14 adapted to contain a supply of lubricant. Openings 16 and 18 have been provided to conduct lubricant from the reservoir 14 to the cylinder 12. The end 20 of the cylinder is provided with an outlet fitting 22 through which lubricant from the cylinder 12 is supplied to the brakes.

A piston 24 is arranged for reciprocation in the cylinder 12 and is provided with a rod 26 connected to an operating mechanism such as a brake pedal, not shown. The outward movement of the piston 24 is restricted by a wall member in the form of a washer 28 held in a counterbore by a spring ring 30. A flexible covering 32 is provided between the end of the housing 10 and the rod 26 to seal the cylinder.

Heretofore, packing members have been used in connection with pistons and cylinders of the type illustrated and while good results have been obtained, there are certain conditions under which they fail.

If yieldable packings such as rubber are used, they become hard and inelastic when subjected to extremely cold temperatures. This causes the packings to take a permanent set and the packings do not exert a radial pressure against the cylinder wall thereby causing the lubricant to leak past the packings.

I have provided an expander for a packing member which urges the packing radially into tight engagement with the cylinder wall although its inherent resiliency may have been destroyed by cold temperatures.

In the form illustrated the packing member has a radially extending closed base portion 34 and an axially extending flange portion 36. The outer diameter of the flange 36 is substantially equal to the diameter of the cylinder 12 and the inner periphery diverges outwardly. The expander is located within the flange 36 and comprises a base portion 38 and a frusto-conical flange portion 40. This flange 40 diverges outwardly at an angle larger than the angle of the inner periphery of the flange 36. A radially extending flange 42 is arranged at the outer periphery of the flange 40 and has an outer diameter substantially equal to the diameter of the cylinder 12.

The flange 42 is spaced axially from the end of the flange 36 and the base portions 38 and 34 are spaced axially. A coil spring 44 is arranged for compression between the end wall 20 and the base portion 38, urging the expander into wedging with the flange 36, expanding the latter radially into sealing engagement with the cylinder wall 12. The spring also urges the base portion 34 into contact with the head of the piston 24.

It will be understood that while I have illustrated a preferred embodiment of my invention, various changes including the size, shape and arrangement of parts may be made without departing from the spirit of my invention and it is my intention to cover by the appended such changes as may be reasonably included within the scope thereof.

What I claim is:

1. In a device of the class described including a cylinder and a piston having a closed head; a packing for said piston comprising a yieldable cup member having a closed base portion and an axially extending flange portion having an outer diameter substantially equal to the outer diameter of the piston with which it is to be used, a second cup member disposed in cooperative relationship with said yieldable cup member and having a closed base portion normally spaced from the base portion of said yieldable cup member, a frusto-conical portion extending outwardly and axially from the outer periphery of said last named base portion and engaging the axially extending flange portion of said yieldable cup member, a radially extending flange at the open end of said frusto-conical portion having an outer diameter substantially equal to the outer diameter of the flange on said yieldable cup member; and resilient means in engagement with said second cup member for urging said cup members into nested relation and for contacting the closed base portion of said yieldable packing against the closed head of the piston.

2. In a device of the class described including a cylinder and a piston; a packing member comprising a rubber cup member for said piston having a base portion and an axially extending flange, the outer periphery of said flange being substantially parallel to the axis of said cup member and the inner periphery diverging outwardly, a metallic cup member nested within said first named cup member having a base portion spaced from the base portion of said first named cup member, a frusto-conical flange at the outer periphery of said last named base portion diverging outwardly at an angle greater than the angle of the inner periphery of the first named flange and in engagement therewith, a radially extending flange on the outer edge portion of said frusto-conical flange having an outer diameter substantially equal to the outer diameter of said first named flange, said radial flange maintaining said cup members in axial alignment; and resilient means in engagement with said metallic cup member for urging said cup members into nested relation for expanding the axially extending flange of said rubber cup member radially.

WILLIAM STANLEY WATSON.